(12) United States Patent
Osborn et al.

(10) Patent No.: US 12,051,066 B2
(45) Date of Patent: Jul. 30, 2024

(54) SYSTEMS AND METHODS FOR VALIDATING ASSET DESTINATIONS IN BLOCKCHAIN NETWORKS

(71) Applicant: Capital One Services, LLC, McLean, VA (US)

(72) Inventors: Kevin Osborn, Newton Highlands, MA (US); Xiaoguang Zhu, New York, NY (US); Samuel Rapowitz, Roswell, GA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 183 days.

(21) Appl. No.: 17/695,755

(22) Filed: Mar. 15, 2022

(65) Prior Publication Data

US 2023/0298016 A1 Sep. 21, 2023

(51) Int. Cl.
*G06Q 40/00* (2023.01)
*G06N 20/00* (2019.01)
(Continued)

(52) U.S. Cl.
CPC ........... *G06Q 20/389* (2013.01); *G06N 20/00* (2019.01); *G06Q 20/36* (2013.01); *G06Q 20/4016* (2013.01)

(58) Field of Classification Search
CPC .. G06Q 20/389; G06Q 20/36; G06Q 20/4016; G06N 20/00
See application file for complete search history.

(56) References Cited

U.S. PATENT DOCUMENTS 10,817,967 B2   10/2020   Chabanne et al.
2018/0097635 A1  4/2018   Moses
(Continued)

FOREIGN PATENT DOCUMENTS

WO   WO-2020150741 A1 *  7/2020  ........... G06Q 20/065
WO   WO-2020197642 A1 * 10/2020  ......... G06F 16/1824

OTHER PUBLICATIONS

Yen, "The Oracle Problem: Unlocking the Potential of Blockchain," School of Engineering and Applied Science, University of Pennsylvania, 2020 (Year: 2020).*

(Continued)

*Primary Examiner* — Abhishek Vyas
*Assistant Examiner* — William B. Bunker
(74) *Attorney, Agent, or Firm* — TROUTMAN PEPPER HAMILTON SANDERS LLP; Christopher J. Forstner; John A. Morrissett

(57) ABSTRACT

The disclosed technology relates to blockchain asset transfer destination verification to reduce fraudulent activity and increase confidence in digital asset transfers. An exemplary oracle device may apply a machine learning model to transaction context data received from a source device to generate a confidence score informed based on transaction pattern data for the destination address. The transaction context data may include a destination address and may be associated with a transfer of an asset via a blockchain network. The generated confidence score may then be sent by the oracle device to the source device to facilitate an informed decision by a user of the source device as to whether to proceed with the transaction. The machine learning model may then be updated based on the transaction context data and a completion indication received from the source device and indicative of whether the asset was transferred via the destination address.

17 Claims, 6 Drawing Sheets

(51) Int. Cl.
*G06Q 20/36* (2012.01)
*G06Q 20/38* (2012.01)
*G06Q 20/40* (2012.01)

(56) References Cited

U.S. PATENT DOCUMENTS

| | | |
|---|---|---|
| 2018/0285879 A1 | 10/2018 | Gadnis et al. |
| 2018/0374097 A1 | 12/2018 | Hanna |
| 2019/0303942 A1* | 10/2019 | Balaraman ............ H04L 9/3239 |
| 2020/0027089 A1* | 1/2020 | Kuchar .............. G06Q 20/3821 |
| 2020/0184479 A1* | 6/2020 | Benkreira .......... G06Q 20/0658 |
| 2020/0313897 A1* | 10/2020 | Heath .................... G06Q 50/28 |
| 2021/0209091 A1* | 7/2021 | Jing ........................ H04L 63/12 |
| 2021/0365948 A1* | 11/2021 | Briscombe ......... G06Q 20/4016 |
| 2021/0383377 A1 | 12/2021 | Zhou et al. |
| 2022/0337607 A1* | 10/2022 | Manevich ............... G06N 20/00 |
| 2022/0414664 A1* | 12/2022 | Liu ....................... H04L 9/3247 |
| 2023/0177515 A1* | 6/2023 | Bravick ................... H04L 9/50 705/75 |
| 2023/0214939 A1* | 7/2023 | Vieira ...................... H04L 9/50 705/30 |
| 2023/0281604 A1* | 9/2023 | Robell ................ G06Q 30/018 |

OTHER PUBLICATIONS

Dillenberger et al., "Blockchain analytics and artificial intelligence," IBM J. Res & Dev., vol. 63 No. 2/3 Paper 5 Mar./May 2019 (Year: 2019).*

* cited by examiner

SYSTEMS AND METHODS FOR VALIDATING ASSET DESTINATIONS IN BLOCKCHAIN NETWORKS

FIELD

The disclosed technology relates to systems and methods for validating asset destinations in blockchain networks and more particularly to improved destination blockchain address verification for digital asset transfers using machine learning.

BACKGROUND

Decentralized ledgers, such as blockchains, are important tools in the digital economy to manage digital assets. Blockchains can be used to manage any number of digital assets, from fine art to currency, the latter often referred to as cryptocurrency. The benefits of blockchain technology include heightened trust in digital transactions, decentralization of transactions so that no single entity controls the environment, and increased security. The security comes, in part, by the fact that the entire record of a digital asset is memorialized and encrypted.

A typical method of managing and transferring digital assets in a blockchain is to use a payment client, such as a hierarchical deterministic digital wallet application that can be executed on a client mobile device, for example. Payment clients can provide a graphical interface to facilitate the transfer of digital assets, such as to accomplish a payment for a good or service. Accordingly, a user may enter a destination address for a specified amount of digital assets into the graphical interface provided by the payment client in order to transfer the amount of digital assets maintained in the user's digital wallet, for example, to a third party.

However, destination blockchain addresses can be complex and are susceptible to inaccurate entry, resulting in an unintentional transfer of digital assets to an unknown and/or undesirable third party. Additionally, users can be the victim of fraudulent activity that passes one address off for another and results in an asset transfer or payment to a fraudulent third party. Accordingly, it is currently challenging to verify the accuracy or authenticity of a destination blockchain address with respect to a third party to which a user desired to transfer digital assets.

BRIEF SUMMARY OF THE INVENTION

Examples of the present disclosure provide solutions to the issues associated with destination blockchain address verification for digital asset transfers. The present disclosure describes and illustrates an oracle device that leverages machine learning to provide objective advice and/or verification of destination addresses associated with proposed digital asset transactions to improve the likelihood that the destination addresses correspond with a desired or expected third party. The confidence scores generated by the oracle device allow users to have increased confidence in the destination of their blockchain payments and other digital asset transfers, thereby facilitating reduced fraud and increased payment accuracy.

The disclosed technology includes an oracle device that includes a processor and memory in communication with the processor and storing instructions that, when executed by the processor, are configured to cause the oracle device to perform one or more methods. For example, the oracle device may train a machine learning model based on transaction pattern data for a plurality of blockchain payment transactions associated with a plurality of entities. The oracle device may then receive transaction context data from a wallet application executed by a client device. The transaction context data includes a destination blockchain address and is associated with a proposed transaction that includes a transfer of an asset maintained by the wallet application to a recipient via a blockchain network. The trained machine learning model may then be applied by the oracle device to the transaction context data to generate a confidence score indicative of validity of the proposed transaction. The confidence score is then sent by the oracle device to the wallet application in response to the transaction context data and for display by the client device. The oracle device may subsequently update the machine learning model based on the transaction context data and a completion indication received from the wallet application and indicative of whether the asset was transferred to the recipient via the destination blockchain address.

The disclosed technology includes another oracle device that includes a processor and memory in communication with the processor and storing instructions that, when executed by the processor, are configured to cause the oracle device to perform one or more methods. For example, the oracle device may receive transaction context data from a blockchain node of a blockchain network and following execution of a smart contract on the blockchain node. The transaction context data includes a destination address and is associated with an automated transfer of an asset via the blockchain network. The oracle device may then apply a machine learning model to the transaction context data to generate a confidence score indicative of validity of the automated transfer. The generated confidence score may be sent by the oracle device to the blockchain node. The oracle device may subsequently update the machine learning model based on the transaction context data and a completion indication received from the blockchain node and indicative of whether the asset was transferred via the destination address and the blockchain network.

The disclosed technology includes yet another oracle device that includes a processor and memory in communication with the processor and storing instructions that, when executed by the processor, are configured to cause the oracle device to perform one or more methods. For example, the oracle device may receive transaction context data from a source device. The transaction context data may include a destination address and is associated with a transfer of an asset via a blockchain network. The oracle device may then apply a machine learning model to the transaction context data to generate a confidence score. The generated confidence score may be sent by the oracle device to the source device in response to the transaction context data. The oracle device may subsequently update the machine learning model based on the transaction context data and a completion indication received from the source device and indicative of whether the asset was transferred via the destination address.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Figure 1:
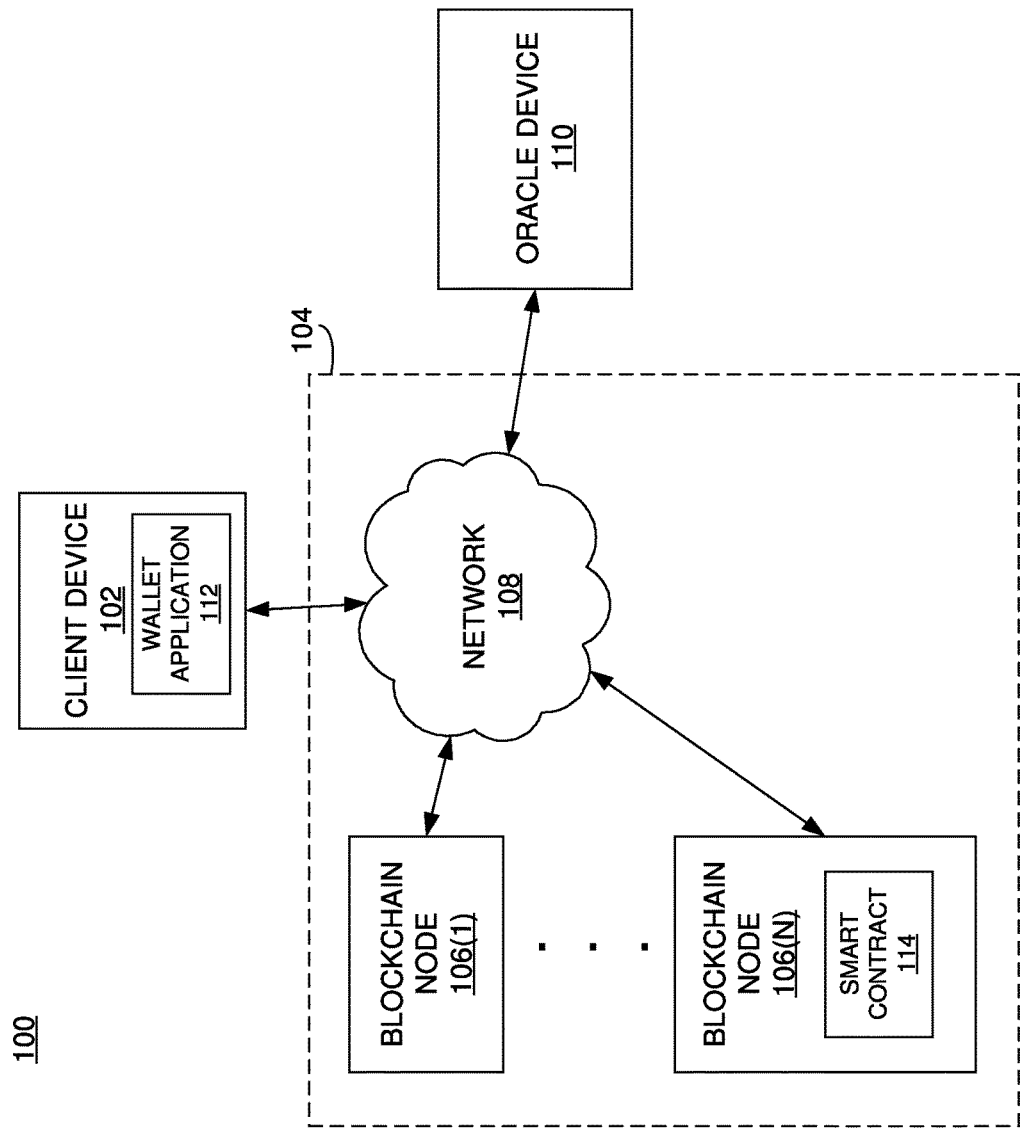
FIG. 1 is a block diagram of an example system environment that includes a client device, a blockchain network, and an oracle device, in accordance with one or more examples of the disclosed technology.

Examples of the disclosed technology may be utilized to improve the accuracy with which digital assets are transferred within blockchain networks. A machine learning model 230 is trained based on public blockchain data and external source data and used to analyze transaction context data for proposed transactions to generate confidence scores indicative of a validity of the destination blockchain address with respect to the proposed transaction. For example, if amounts and/or types of purchases associated with the destination blockchain address in historical transaction pattern data do not sufficiently correlate with the amount and/or type of purchase indicated in the transaction context data for a proposed transaction, then the confidence score for the proposed transaction that is generated based on the application of the machine learning model 230 may be relatively low.

The machine learning model 230 can be trained and/or deployed by an oracle device 110 and applied in response to a request associated with a proposed transaction that includes a transfer of assets to a destination blockchain address. In some examples, the request can be generated by a wallet application 112 or other payment client executed by a client device 102. The wallet application 112 can generate and output a graphical interface that includes the confidence score and allows a user to make a more informed decision regarding whether to proceed with the transfer of the assets to the destination blockchain address associated with the proposed transaction.

In other examples, the request can be generated by a smart contract 114 executed by a blockchain node 106. The smart contract 114 can be configured to compare the confidence score to a threshold to determine whether to allow a transfer of assets defined in the smart contract to proceed to a destination blockchain address. In other examples, the oracle device 110 can generate a binary value, optionally based on the confidence score and/or a defined threshold, which is returned to the smart contract 114 and used by the smart contract 114 to determine whether to allow an automated transaction to proceed.

As will be described and illustrated in more detail below, by leveraging machine learning, this technology improves the accuracy with which digital assets are transferred in blockchain networks. Accordingly, implementations of the disclosed technology provide a more effective method of transferring digital assets that reduces inaccurate payments, mitigates fraudulent activity, and improves the confidence with which users and automated blockchain nodes 106(1)-106(n) (e.g., via smart contract 114) exchange digital assets and/or currency.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 is a block diagram of an example system environment 100 that includes a client device 102, blockchain nodes 106(1)-106(n) in a blockchain network 104, and an oracle device 110, in accordance with one or more examples of the disclosed technology. The client device 102, oracle device 110, and blockchain nodes 106(1)-106(n) are coupled together via one or more communication networks 108, such as one or more wide area networks (WANs), for example.

The client device 102 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer), for example. The client device 102 hosts a wallet application 112 in this particular example, although other types of payment clients configured to manage digital assets and communicate with the blockchain network 104 can also be used. The wallet application 112 can provide an interface for a user to input transaction context data regarding a transfer (e.g., payment) of digital assets hosted by the wallet application 112 to a third party, such as an identifier (e.g., name) of the third party and a destination blockchain address in the blockchain network 104 and associated with the third party, for example. The wallet application 112 is also configured to communicate the obtained transaction context data or a portion thereof to the oracle device 110 and obtain an indication (e.g., confidence score) of the validity of the proposed transaction in response, which can be output to inform the user regarding whether the proposed transaction should proceed.

One or more of the blockchain nodes 106(1)-106(n) can be a personal computing device similar to the client device 102 or another device such as a server. The blockchain nodes 106(1)-106(n) of the blockchain network 104 can communicate with the oracle device 110 over a wired or wireless network 108. The network 108 can, therefore, facilitate transactions being made in the blockchain network 104 (e.g., trades or payments in cryptocurrency) between the blockchain nodes 106(1)-106(n), and can facilitate receipt from the oracle device 110, and subsequent use, of the confidence scores described herein. In some examples, one of the blockchain nodes 106(n) hosts a smart contract 114 that is a set of executable instructions configured to automatically send a request to the oracle device 110, receive a response indicative of the validity of a transaction defined by the executable instructions, and selectively carry out the transaction (e.g., transfer digital assets to a third party) based on the response from the oracle device 110.

Accordingly, the oracle device 110 can sit outside the framework of the blockchain network 104, as shown, and can obtain data from both outside and inside the blockchain network 104 as well as communicate with the client device 102 and the blockchain nodes 106(1)-106(n). In particular, the oracle device 110 can utilize a trained machine learning model 230 to generate and return a confidence score from transaction context data received from the client device 102 or the blockchain node 106(n). The machine learning model 230 can be trained using a training data set, as well as public blockchain data and external source data, to analyze transaction context data, including destination blockchain addresses therein, to generate a confidence score indicative of the validity of the transaction (e.g., whether the destination blockchain address is accurate or appropriate for the transaction).

Figure 2:
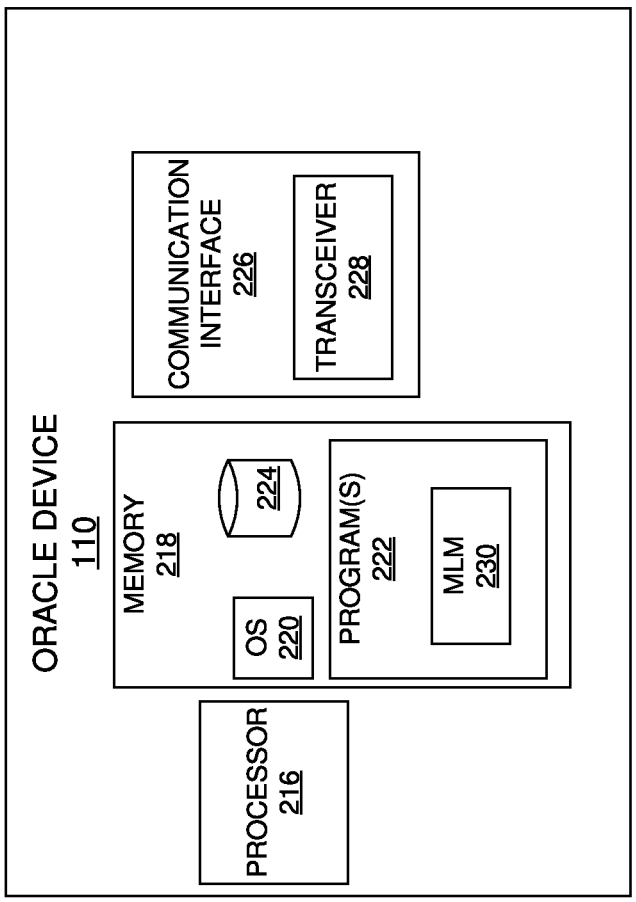
FIG. 2 is a component diagram of an oracle device, in accordance with one or more examples of the disclosed technology.

FIG. 2 is a component diagram of the oracle device 110, in accordance with one or more examples of the disclosed technology. The oracle device 110 can include a processor 216, memory 218, and data storage (e.g., investigation database 224). The processor 216 can include one or more of a microprocessor, microcontroller, digital signal processor, co-processor or the like or combinations thereof capable of executing stored instructions and operating upon stored data.

The memory 218 of the oracle device 110 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), non-transitory computer-readable medium, and the like), for storing files and/or applications (e.g., a web browser application, a widget or gadget engine, and or other applications, as necessary), executable instructions and data.

The memory 218 of the oracle device 110 can contain an operating system ("OS") 220 that can run program(s) 222. The program(s) 222 can perform one or more functions of the disclosed examples. The programs 222 can include, for example, a program for processing transaction context data, generating confidence scores, and interfacing with external devices (e.g., the client device 102 and/or blockchain nodes 106(1)-106(n)) and a machine learning model 230. The machine learning model 230 can be configured to process transaction context data to generate a confidence score, as described and illustrated in more detail below. The memory 218 can also include any combination of one or more databases, including for example investigation database 224, controlled by memory controller devices (e.g., server(s), etc.) or software, such as document management systems, Microsoft® SQL databases, SharePoint® databases, Oracle® databases, Sybase® databases, or other relational databases.

The oracle device 110 can also include a communication interface 226 for communicating with external systems or internal systems. The communication interface 226 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 222 can include a transceiver 228 to communicate with compatible devices, for example via short range, long range (e.g., cellular, local area networks (LAN), wide area networks (WAN), etc.), or similar technologies that enables the oracle device 110 to communicate via the network 108 described herein.

Figure 3:
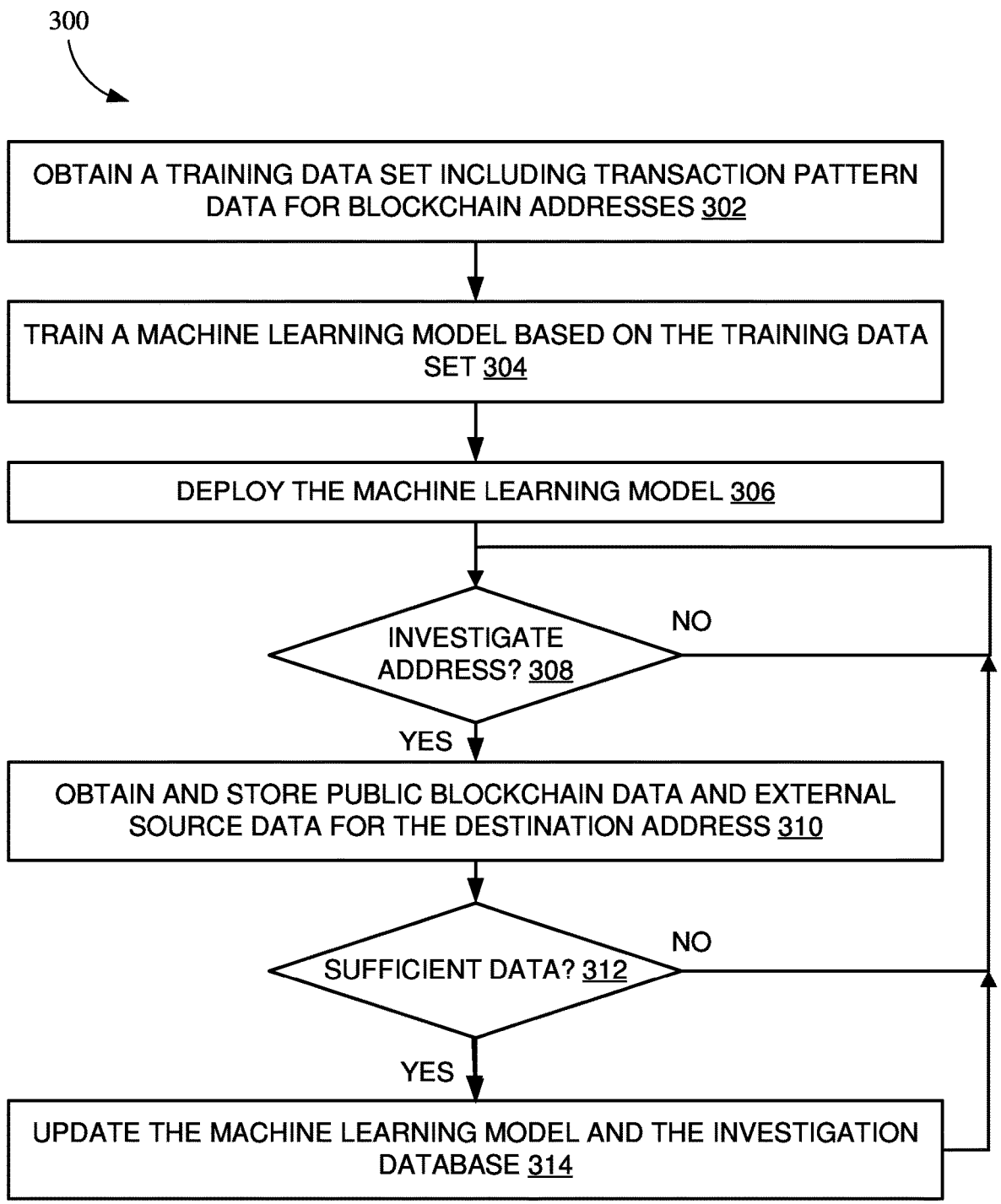
FIG. 3 is a flow diagram of an example method for training and deploying a machine learning model based on public blockchain data and external source data, in accordance with one or more examples of the disclosed technology.

FIG. 3 is a flow diagram of an example method 300 for training and deploying the machine learning model 230 based on public blockchain data and external source data, in accordance with one or more examples of the disclosed technology. Method 300 may be performed by the oracle device 110, which includes the processor 216 and memory 218 in communication with the processor 216 and storing instructions. When executed by the processor 216, the stored instructions cause the oracle device 110 to perform certain functions, such as one or more steps described and illustrated herein with reference to method 300.

In block 302, the oracle device 110 may obtain a training data set including transaction pattern data for blockchain addresses associated with recipients of blockchain asset transfers. The training data set can be constructed from known entities (e.g., that receive payments in exchange for goods and/or services) and transaction pattern data for blockchain transactions associated with those entities. The transaction pattern data can include a payment type indicating a purchase, sale, or peer-to-peer transfer, an amount, and/or a category of associated goods or services associated with the transactions, for example, although other types of data can be included in other examples.

In block 304, the oracle device 110 may train the machine learning model 230 by analyzing trends and patterns in the obtained training data set. For example, the machine learning model 230 may determine over time and during its training that transactions associated with peer-to-peer transfers are generally below a particular amount, transactions associated with a particular retailer are generally above a particular amount, and/or that particular categories and/or blockchain addresses are more likely to be associated with fraudulent transactions.

Accordingly, the training in block 304 can be supervised in some examples using a neural network training algorithm while the machine learning model 230 is offline before being deployed by the oracle device 110 and/or subsequent to deployment in order to continually improve accuracy. Accordingly, the oracle device 110 may utilize deep learning models, such as a convolutional neural network (CNN) or long short-term memory (LSTM), for example. In other examples, the machine learning model 230 may be a binary classifier, such as a Support Vector Machine (SVM), logistic regression, random forest, or XGBoost, for example, and other types of machine learning models can also be used in other examples.

In block 306, the oracle device 110 may deploy the machine learning model 230 and begin receiving requests from the wallet application 112 and/or the smart contract 114, for example. Optionally, the oracle device 110 can continue to train the machine learning model 230 as transactions are observed for which the machine learning model 230 has insufficient data to provide a threshold level of accuracy. At least the destination blockchain address, and optionally additional transaction context data, for such transactions can be inserted into the investigation database 224, as described and illustrated in more detail later with reference to FIG. 4, for asynchronous forensic analysis explained below with reference to blocks 306-314.

Accordingly, in block 308, the oracle device 110 may determine whether at least one blockchain address (e.g., an address in the blockchain network 104) is currently maintained in the investigation database 224. The blockchain address can be associated with another cryptocurrency wallet, another smart contract, or any other data structure or application addressable on the blockchain network 104. If the oracle device 110 determines that there is no blockchain address that currently requires investigation, then the "No" branch is taken back to block 308 and the oracle device 110 effectively waits for the investigation database 224 to be populated in this example. However, if the oracle device 110 determines that there is a blockchain address that requires investigation or forensic analysis, then the "Yes" branch is taken to block 310.

In block 310, the oracle device 110 may obtain and/or store public blockchain data and/or external source data for the blockchain address. For example, to obtain the public blockchain data, the oracle device 110 can query the blockchain network 104 for historical transactions involving the blockchain address to determine typical buy and/or sell patterns (e.g., buys 75% of the time and sells 25% of the time), metadata from smart contracts that indicate goods or services transacted, registered URLs, contract certifications, and/or transaction amounts.

In some examples, the oracle device 110 can query external sources (e.g., databases or servers accessible via API) to obtain address identity verification data from exchanges (e.g., a particular blockchain address has been authenticated or confirmed to belong to an identified retailer or fraud has been reported with respect to a blockchain address). As another example, the external source data can be obtained via web scraping, which can yield information such as an indication that an identified retailer is advertised on a commercial website as associated with a particular blockchain address, for example. By being hosted external to the blockchain network 104, the oracle device 110 can advantageously access external source data as well as public blockchain data, which can facilitate a more robust machine learning model 230.

In block 312, the oracle device 110 may determine whether sufficient public blockchain and/or external source data has been obtained for the blockchain address for which the forensic analysis was performed in block 312. The sufficiency of the data can be determined based on an accuracy metric (e.g., classification accuracy, logarithmic loss, or confusion matrix) with respect to the machine learning model 230 and the particular blockchain address, for example. In other examples, the sufficiency of the data can be based on a threshold number of historical blockchain addresses associated with the obtained public blockchain data, and other methods for analyzing the sufficiency of the data can also be used in other examples.

If the oracle device 110 determines that the data is insufficient, then the "No" branch is taken back to block 308 and the blockchain address remains in the investigation database 224 for additional subsequent forensic analysis in a later iteration. However, if the oracle device 110 determines that the data obtained in block 310 is sufficient, then the "Yes" branch is taken to block 314.

In block 314, the oracle device 110 may update the machine learning model 230 and the investigation database 224. The investigation database 224 can be updated to remove the blockchain address, for example. The machine learning model 230 can be updated with respect to distribution(s) for blockchain addresses. The distribution(s) can include a payment type distribution, an amount distribution, a purpose distribution, and/or a category of associated goods or services distribution. For example, a particular purpose can have an associated amount distribution indicative of the historical transactions associated with that purpose. Accordingly, the oracle device 110 in this particular example continuously updates the machine learning model 230 based on an offline or asynchronous forensic analysis of blockchain addresses associated with observed transactions.

While a machine learning model 230 is used in the examples described and illustrated herein, one or more databases could also be used that include correlations of blockchain addresses with transaction context data and/or distributions, for example. In yet other examples, records of definitive fact (e.g., address/legal entity association, verified fraud report, etc.) can be recorded into the blockchain hosted by the blockchain network 104 as a non-fungible token (NFT), owned by a service hosting the oracle device 110, but available to be queried by the public, for example. The NFTs can be recorded for blockchain addresses confirmed with certainty to be fraudulent or to correspond with a particular identifier (e.g., retailer name). Other types of data structures and methods for facilitating analysis of the validity of blockchain addresses can also be used.

Subsequent to the updates in block 314, the oracle device 110 proceeds back to block 308 in this example. One or more of blocks 302-314 can occur in a different order and/or in parallel in other examples. For example, blocks 308-314 can be performed in parallel for any number of blockchain addresses.

Figure 4:
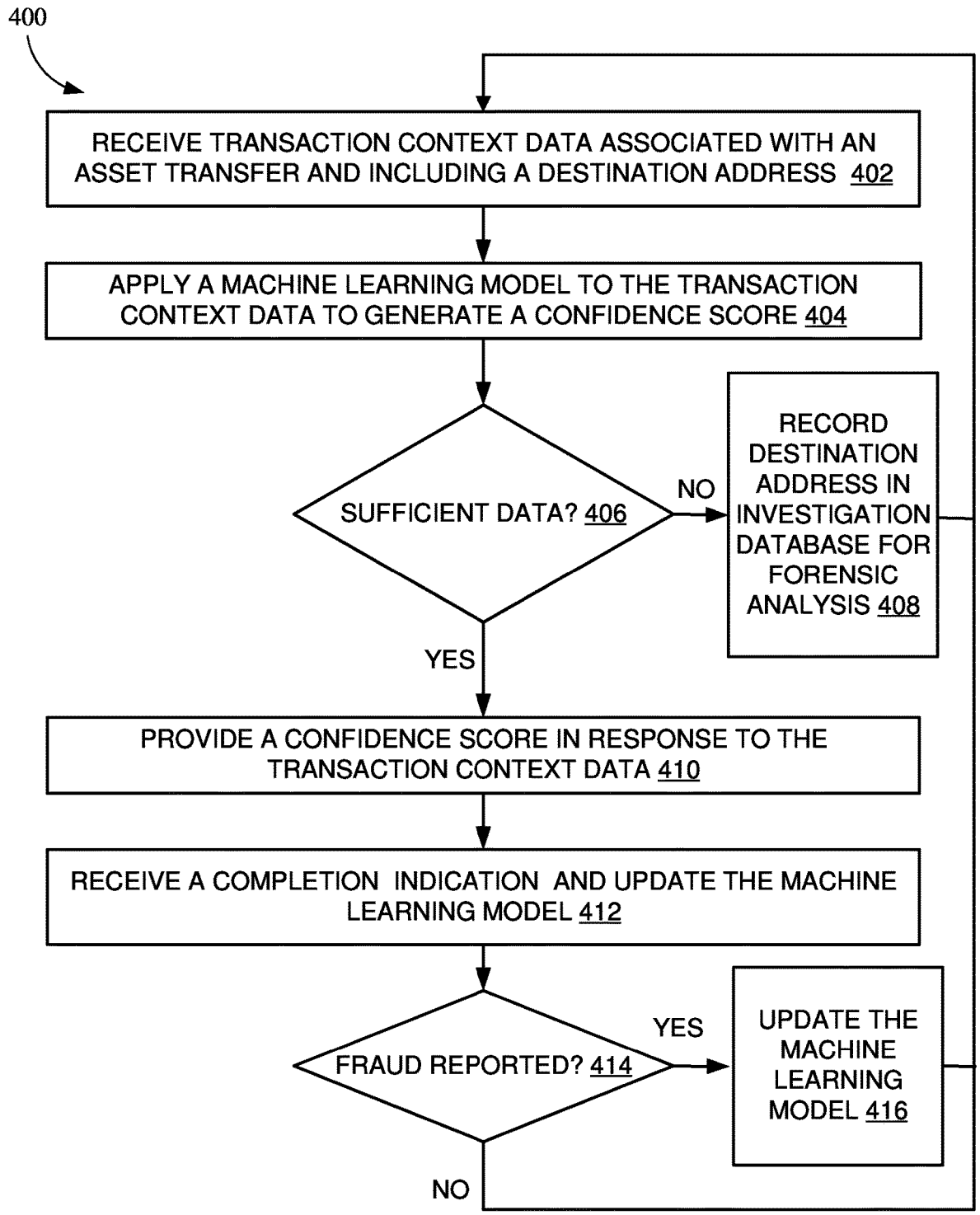
FIG. 4 is a flow diagram of an example method for generating and providing to a wallet application a confidence score indicative of validity of a destination blockchain address, in accordance with one or more examples of the disclosed technology.

FIG. 4 is a flow diagram of an example method 400 for generating and providing to the wallet application 112 a confidence score indicative of validity of a destination blockchain address, in accordance with one or more examples of the disclosed technology. Method 400 may be performed by the oracle device 110 in some examples, which includes the processor 216 and memory 218 in communication with the processor 216 and storing instructions. When executed by the processor 216, the stored instructions cause the oracle device 110 to perform functions such as one or more steps described and illustrated herein with reference to method 400.

In block 402, the oracle device 110 may receive transaction context data associated with an asset transfer and including at least a destination blockchain address. In addition to the destination blockchain address to which a digital asset associated with the transaction is to be sent, the transaction context data can include an identity of a recipient of the asset, a purpose of the transfer, an amount of the transfer, or a category of goods or services associated with the transfer, for example, and other contextual information associated with the transaction can also be received in block 402.

By way of example only, the transaction context data can be received from the wallet application 112 in this example via an API provided by the oracle device 110, but the transaction context data could be received from other sources, including the smart contract 114 as described and illustrated in detail below, in other examples. Accordingly, a user of the client device 102 can execute the wallet application 112, which can be configured to output a graphical interface to a display of the client device 102. Via the graphical interface, the user can input an amount of a digital asset, an identifier (e.g., retailer name) of a recipient of the amount of the digital asset, and the destination blockchain address the user believes to belong to the recipient. The wallet application 112 can further be configured to send the transaction context data obtained via the graphical interface and from the user in a request, which is received by the oracle device 110 in block 402.

In block 404, the oracle device 110 may apply the machine learning model 230 to the transaction context data obtained in block 402 to generate a confidence score. Accordingly, the machine learning model 230 in some examples is configured to compare portion(s) of the transaction context data to generated distribution(s) for the destination blockchain address in order to generate the confidence score.

For example, the amount of the digital asset being in the top five percent of the amount distribution for historical transactions associated with the destination blockchain address, may negatively impact the confidence score. In other words, an atypical digital asset amount for the transaction may indicate that the destination blockchain address is inaccurate or invalid, and not associated with the retailer identified by the user in the transaction context data. Accordingly, the confidence score in some examples is indicative of validity of the proposed transaction and/or reflects a likelihood that the recipient identity corresponds with the destination blockchain address or that the destination address belongs to the recipient identity.

Optionally, prior to applying the machine learning model 230, the oracle device 110 can query the blockchain network 104 based on the destination blockchain address to determine whether any NFTs have been recorded that indicate that the destination blockchain address certainly belong to a recipient identity or has certainly been determined to be fraudulent. The confidence score in these examples may be generated based on a result of such a query.

In block 406, the oracle device 110 may determine whether sufficient data is available for the machine learning model 230 to facilitate generation of a relatively accurate confidence score. In some examples, the oracle device 110 can determine that insufficient data is available for the destination blockchain address when the generated confidence score is below a defined threshold value. In other examples, the sufficiency of the data and/or the machine learning model 230 can be determined as described and illustrated in more detail above with reference to block 312 of FIG. 3, and other methods for determining whether the data supporting the machine learning model 230 is sufficient can also be used.

If the oracle device 110 determines that the data is insufficient to effectively or accurately analyze the destination blockchain address in the transaction context data, then the "No" branch is taken to block 408. In block 408, the oracle device 110 may record the destination blockchain address in an entry of the investigation database 224 for offline or asynchronous forensic analysis, as described and illustrated in more detail above with reference to blocks 306-314 of FIG. 3. Optionally, the oracle device 110 can return an indication of the inability to generate a confidence score (e.g., a neutral confidence score) to the wallet application 112. However, if the oracle device 110 determines in block 406 that there is sufficient data for the machine learning model 230 to generate a relatively accurate confidence score, then the "Yes" branch is taken to block 410.

In block 410, the oracle device 110 may provide the generated confidence score in response to the request with the transaction context data received in block 402. In this example, the generated confidence score is returned to the wallet application 112. The wallet application 112 can be configured to then output the confidence score to the display of the client device 102 to allow the user to determine whether to proceed with the transaction. Accordingly, the confidence score facilitates a more informed decision on the part of the user as to the likelihood that the destination blockchain address entered for the proposed transaction is associated with the desired recipient of the digital asset identified for the proposed transaction. In other examples, the wallet application 112 can be configured to automatically make a decision regarding whether to allow or decline the transaction based on the confidence score. For example, the wallet application 112 can be configured to automatically allow the proposed transaction to proceed with the digital asset transfer to the destination blockchain address when the confidence score exceeds a predefined threshold.

In block 412, the oracle device 110 optionally receives a completion indication and updates the machine learning model 230 accordingly. In this example, the wallet application 112 is configured to provide an indication as to whether the transaction was completed according to its automated decision, or the decision input by a user of the client device 102, for example. The oracle device 110 can then update the machine learning model 230. For example, a relatively large number of transactions associated with the destination blockchain address and recipient identifier pair being declined may have a negative impact on confidence scores subsequently generated for that data pair because the failure to complete those transactions may indicate that users determined the destination blockchain address did not likely correspond with the recipient identifier.

In block 414, the oracle device 110 optionally determines whether fraud has been reported for the destination blockchain address. In some examples, the wallet application 112 facilitates an interface for a user of the client device 102 to input a blockchain address that the user has learned may be fraudulent, although other methods for fraud reporting can also be used in other examples. If the oracle device 110 determines that fraud has been reported for a blockchain address, then the "Yes" branch is taken to block 416.

In block 416, the oracle device 110 may update the machine learning model 230 based on the reported fraud for the blockchain address. In some examples, the machine learning model 230 can be updated such that a relatively low confidence score is generated for the blockchain address. In other examples, the oracle device 110 can add the destination address to the investigation database 224 for subsequent forensic analysis without, or in addition to, updating the machine learning model. In yet other examples, the oracle device 110 can record an NFT that indicates that the blockchain address is fraudulent, as explained in more detail above. Subsequent to recording the destination address in the investigation database 224 in block 408, updating the machine learning model in block 416, or if the oracle device 110 determines that fraud has not been reported for a blockchain address and the "No" branch is taken from block 414, then the oracle device 110 proceeds back to block 402. In other examples, one or more of blocks 402-416 can be performed in a different order and/or in parallel. For example, blocks 402-416 can be performed in parallel for any number of requests received from any number of wallet applications executed by any number of client devices.

Figure 5:
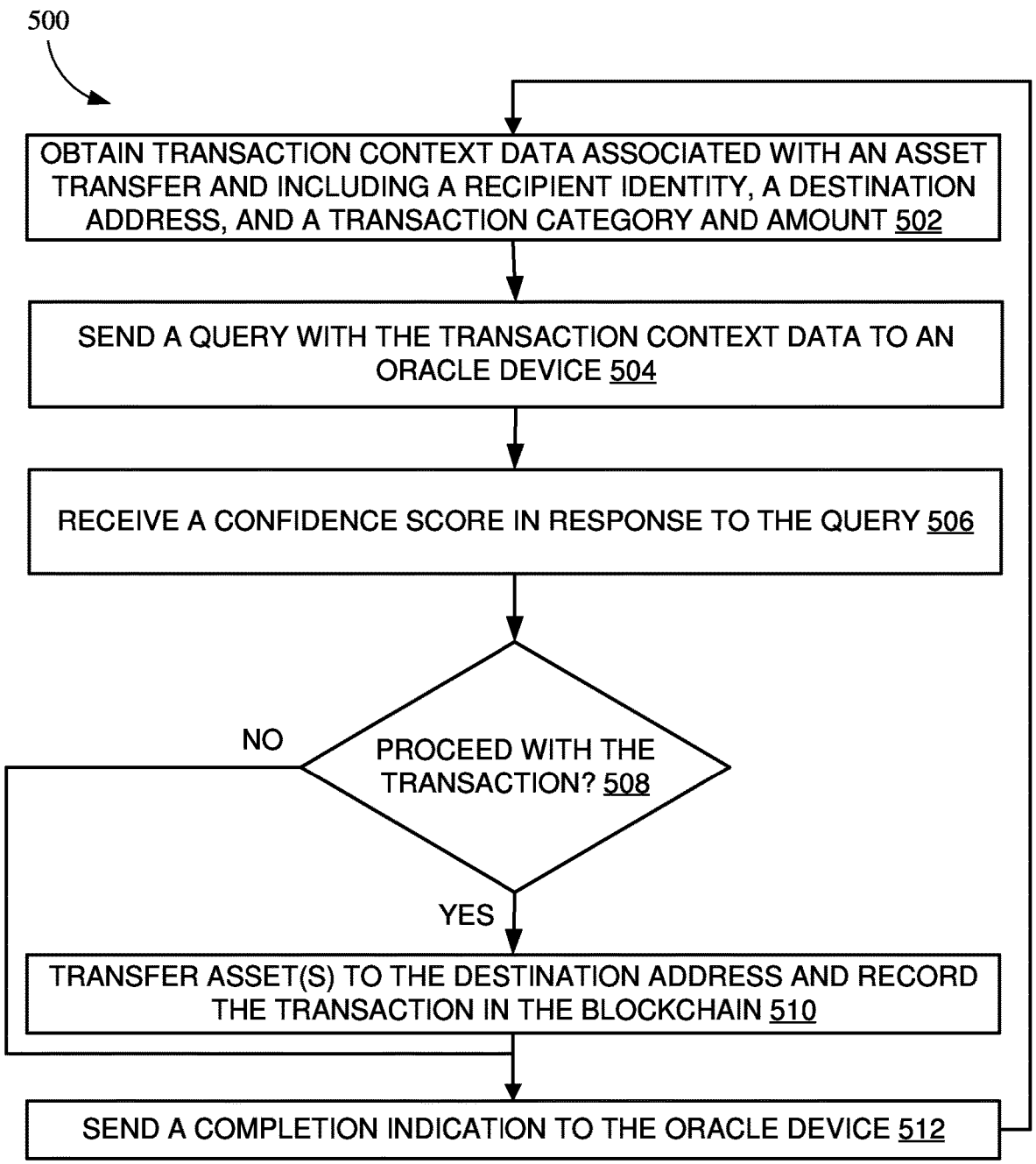
FIG. 5 is a flow diagram of an example method for applying a confidence score with a smart contract to automatically determine whether to carry out an asset transaction, in accordance with one or more examples of the disclosed technology.

FIG. 5 is a flow diagram of an example method 500 for applying a confidence score with the smart contract 114 to automatically determine whether to carry out an asset transaction, in accordance with one or more examples of the disclosed technology. Method 500 may be performed by the blockchain node 106(n) in some examples, which includes a processor and memory in communication with the processor and storing instructions. When executed by the processor of the blockchain node 106(n), the stored instructions cause the blockchain node 106(n) to perform functions such as one or more steps described and illustrated herein with reference to method 500.

In block 502, the blockchain node 106(n) may obtain transaction context data associated with an asset transfer, such as a recipient identity, a destination blockchain address (e.g., an address in the blockchain network 104), a transaction category, and/or a transaction amount. The transaction context data in this example can be the same or similar to that described above with reference to block 402 and can be extracted from the smart contract 114, which defines an automated transfer of the amount of a digital asset to the destination blockchain address. The smart contract 114 can be recorded into the blockchain network 104 to facilitate an automated payment (e.g., to a retailer or service provider), although any other type of smart contracts and/or transactions can also be used in other examples.

In block 504, the blockchain node 106(n) may send a query with the transaction context data to the oracle device 110. The query can be the same or similar to the request sent by the wallet application 112 as explained above with reference to block 402 of FIG. 4. In this example, the smart contract 114 can be configured to automatically send the query at a predefined time and to an endpoint associated with an API made available by the oracle device 110, for example.

In block 506, the blockchain node 106(n) may receive a confidence score in response to the query. The confidence score can be generated in this example as described and illustrated in more detail below with reference to FIG. 6. The confidence score can be a value (e.g., percentage) within a range or a binary positive or negative value, for example.

In block 508, the blockchain node 106(n) may determine whether to proceed with the transaction defined by the smart contract 114. In examples in which the confidence score is a non-binary value, the smart contract 114 can be configured to compare the confidence score to a predefined threshold to determine whether to allow the transaction to proceed. In other examples, the smart contract 114 can be configured to proceed with the transaction based on whether the confidence score is a positive or negative binary value, for example, and other methods for determining whether to proceed with the transaction can also be used. If the blockchain node 106(n) executing the smart contract 114 determines that the transaction should be allowed, then the "Yes" branch is taken to block 510.

In block 510, the blockchain node 106(n) may transfer the amount of the digital asset to the destination blockchain address, as defined in the smart contract 114, and record the transaction in the blockchain network 104. Subsequent to transferring the amount of the digital asset and recording the transaction in block 510, or if the blockchain node 106(n) executing the smart contract 114 determines in block 508 that the transaction should be prevented, then the "No" branch is taken to block 512.

In block 512, the blockchain node 106(n) optionally sends a completion indication to the oracle device 110 in examples in which a non-binary confidence score is provided by the oracle device 110. The completion indication indicates whether the transaction proceeded in this example, and can be used by the oracle device 110 to update the machine learning model, as explained above with reference to block 412 or FIG. 4, for example. In other examples, one or more of blocks 502-512 can be performed in a different order and/or in parallel. For example, blocks 502-512 can be performed in parallel for any number of smart contracts executed by the blockchain node 106(n).

Figure 6:
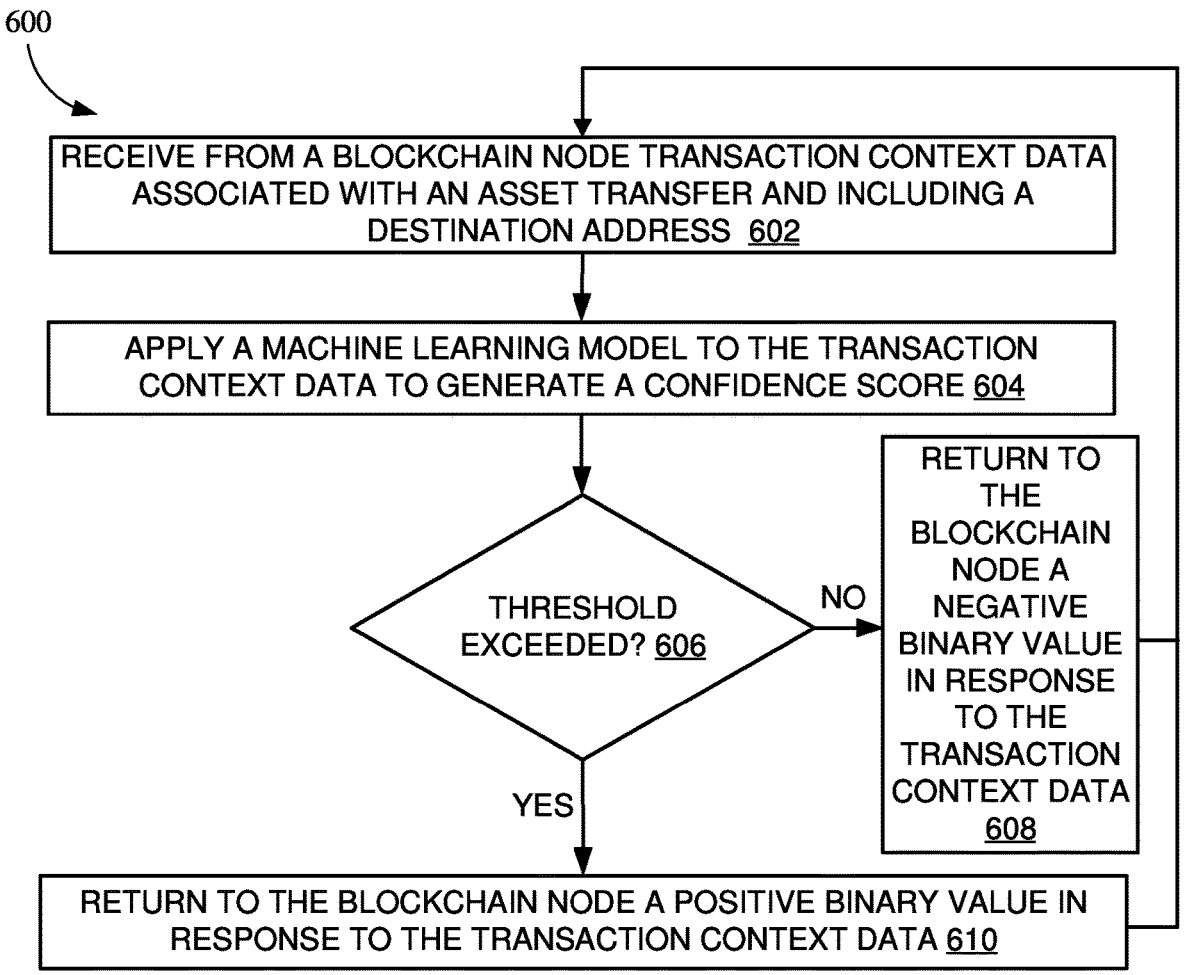
FIG. 6 is a flow diagram of an example method for generating and providing to a blockchain node a confidence score indicative of validity of a destination blockchain address, in accordance with one or more examples of the disclosed technology.

FIG. 6 is a flow diagram of an example method 600 for generating and providing to the blockchain node 106(n) a confidence score indicative of validity of a destination blockchain address, in accordance with one or more examples of the disclosed technology. Method 600 may be performed by the oracle device 110 in some examples, which includes the processor 216 and memory 218 in communication with the processor 216 and storing instructions. When executed by the processor 216, the stored instructions cause the oracle device 110 to perform functions such as one or more steps described and illustrated herein with reference to method 600.

In block 602, the oracle device 110 may receive from the blockchain node 106(n) executing the smart contract 114 transaction context data associated with an asset transfer and including at least a destination address. The transaction context data can be received via a query from the blockchain node 106(n) to an API provided by the oracle device 110, for example, as described above with reference to block 502 of FIG. 5.

In block 604, the oracle device 110 may apply the machine learning model 230 to the transaction context data to generate a confidence score, such as may be described in more detail above with reference to block 404 of FIG. 4, for example.

In block 606, the oracle device 110 may determine whether the generated confidence score exceeds a threshold value. For example, the oracle device 110 can be configured to generate a percentage confidence score indicative of a likelihood that the destination blockchain address in the transaction context data corresponds to a recipient identifier in the transaction context data. In this example, the threshold can be fifty percent, although other thresholds and other types of confidence values can also be used in other examples. If the oracle device 110 determines that the threshold value is not exceeded, then the "No" branch is taken to block 608.

In block 608, the oracle device 110 may return to the blockchain node 106(n) a negative binary value in response to the query that included the transaction context data. The negative binary value can be used by the smart contract 114 executed by the blockchain node 106(n) to prevent the transfer of the digital asset associated with the transaction defined by the smart contract 114. However, if the oracle device 110 determines in block 606 that the threshold value is exceeded, then the "Yes" branch is taken to block 610.

In block 610, the oracle device 110 may return to the blockchain node 106(n) a positive binary value in response to the query that included the transaction context data. In this iteration, the positive binary value can be used by the smart contract 114 executed by the blockchain node 106(n) to allow the transfer of the digital asset associated with the transaction defined by the smart contract 114 to proceed. Accordingly, in this example, the oracle device 110 is configured to return a binary value in response to the query from the blockchain node 106(n) executing the smart contract 114 although in other examples, the non-binary confidence score can also be returned.

Subsequent to returning the positive binary value in block 610 or the negative binary value in block 608, the oracle device 110 proceeds back to block 602 and continues to receive and analyze a subsequent query from the blockchain node 106(n) or another node in the blockchain network 104. In other examples, one or more of blocks 602-610 can be performed in a different order and/or in parallel. For example, blocks 602-610 can be performed in parallel for any number of queries received from any number of blockchain nodes 106(1)-106(n).

As described and illustrated by way of the examples herein, this technology advantageously analyzes transaction context data for proposed digital asset transactions to inform sends of the digital assets as to the likelihood that the destination blockchain address associated with the transaction belongs to a desired recipient of the digital assets. This technology leverages machine learning to generate confidence scores that can be used by users or smart contracts executed by blockchain nodes to determine whether to proceed with a transfer of assets associated with a proposed transaction. Thereby, this technology reduces fraudulent, inaccurate, and/or undesirable digital asset transfers within blockchain networks

EXAMPLE USE CASE

The following example use case describes an example of a typical user flow pattern. This section is intended solely for explanatory purposes and not in limitation. In this example, a user of the client device 102 executes the wallet application 112 and initiates a transaction. The wallet application 112 provides an interface for the user to submit at least a subset of transaction context data for the transaction. In this particular example, the user enters into the graphical interface a recipient identifier corresponding to a watch retailer, an indication that the transaction is a purchase, an indication that the transaction is for a good (e.g., a watch), an amount for the transaction of seven bitcoins, and a destination blockchain address (e.g., an address on the blockchain network 104).

Upon submission of the transaction by the user, the wallet application generates a request to the oracle device 114 that includes at least the transaction context data entered by the user. The oracle device 110 applies the machine learning model 230 and generates a ten percent confidence score, which it returns to the wallet application 112 in response to the request. The oracle device 110 generates the relatively low confidence score at least in part because observed historical purchases of goods from the destination blockchain address indicates a distribution of amounts between zero and one bitcoins, which is significantly lower than the seven bitcoins of the proposed transaction and therefore indicates that the destination blockchain address may not belong to the identified watch retailer.

Following receipt of the confidence score, the wallet application displays the confidence score to the user via another interface and requests entry of authorization to proceed with the transaction. The user in this particular example input a negative selection to cancel the proposed transaction because the confidence score has informed the user that there is a reasonable likelihood that the destination blockchain address is incorrect and further review and/or confirmation may be required before proceeding with a transfer of digital assets to that blockchain address. Accordingly, in response to the negative selection, the wallet application cancels the proposed transaction, thereby preventing the transfer of the seven bitcoins to the destination blockchain address that may not belong to the identified watch retailer and/or may be fraudulent.

In some examples, disclosed systems or methods may involve one or more of the following clauses:

Clause 1: An oracle device, comprising: a processor; and memory in communication with the processor and storing instructions that, when executed by the processor, are configured to cause the oracle device to: train a machine learning model based on transaction pattern data for a plurality of blockchain payment transactions associated with a plurality of entities; receive transaction context data from a wallet application executed by a client device, wherein the transaction context data comprises a destination blockchain address and is associated with a proposed transaction that comprises a transfer of an asset maintained by the wallet application to a recipient via a blockchain network; apply the trained machine learning model to the transaction context data to generate a confidence score indicative of validity of the proposed transaction; send the confidence score to the wallet application in response to the transaction context data and for display by the client device; and update the machine learning model based on the transaction context data and a completion indication received from the wallet application and indicative of whether the asset was transferred to the recipient via the destination blockchain address.

Clause 2: The oracle device of clause 1, wherein the transaction pattern data comprises, for one or more of the blockchain payment transactions, a payment type indicating a purchase, sale, or peer-to-peer transfer, an amount, or a category of associated goods or services.

Clause 3: The oracle device of clause 1, wherein the instructions, when executed by the processor, are further configured to cause the oracle device to, responsive to determining that the confidence score is below a threshold value as a result of the machine learning model having insufficient data, record the destination blockchain address in a database.

Clause 4: The oracle device of clause 3, wherein the instructions, when executed by the processor, are further configured to cause the oracle device to asynchronously retrieve the destination blockchain address from the database and perform a forensic analysis of the destination blockchain address.

Clause 5: The oracle device of clause 4, wherein the instructions, when executed by the processor, are further configured to cause the oracle device to one or more of determine whether fraud has been reported as associated with the destination blockchain address, query one or more blockchain exchange service databases to obtain address identity verification data, or perform web scraping of one or more websites based on the destination blockchain address, in order to perform the forensic analysis.

Clause 6: The oracle device of clause 1, wherein the instructions, when executed by the processor, are further configured to cause the oracle device to: receive from the wallet application an indication of fraudulent activity associated with the proposed transaction subsequent to completion of the proposed transaction; and update the machine learning model based on the indication of fraudulent activity.

Clause 7: The oracle device of clause 1, wherein the transaction context data comprises an identity of the recipient and the confidence score reflects a likelihood that the recipient identity corresponds with the destination blockchain address.

Clause 8: The oracle device of clause 1, wherein the instructions, when executed by the processor, are further configured to cause the oracle device to, in order to update the machine learning model, update one or more distributions for a plurality of destination blockchain addresses associated with a plurality of monitored historical blockchain transactions, wherein the distributions comprise a payment type distribution, an amount distribution, a purpose distribution, or a category of associated goods or services distribution.

Clause 9: The oracle device of clause 1, wherein the instructions, when executed by the processor, are further configured to cause the oracle device to generate the confidence score at least in part based on a comparison of one or more portions of the transaction context data to one or more generated distributions for the destination blockchain address.

Clause 10: The oracle device of clause 1, wherein the transaction context data comprises an identity of the recipient and the instructions, when executed by the processor, are further configured to cause the oracle device to, responsive to determining that the confidence score exceeds a threshold value, record a non-fungible token (NFT) in the blockchain network, wherein the NFT comprises an association of the destination blockchain address and the recipient identity.

Clause 11: An oracle device, comprising: a processor; and memory in communication with the processor and storing instructions that, when executed by the processor, are configured to cause the oracle device to: receive transaction context data from a blockchain node of a blockchain network and following execution of a smart contract on the blockchain node, wherein the transaction context data comprises a destination address and is associated with an automated transfer of an asset via the blockchain network; apply a machine learning model to the transaction context data to generate a confidence score indicative of validity of the automated transfer; send the generated confidence score to the blockchain node; and update the machine learning model based on the transaction context data and a completion indication received from the blockchain node and indicative of whether the asset was transferred via the destination address and the blockchain network.

Clause 12: The oracle device of clause 11, wherein the instructions, when executed by the processor, are further configured to cause the oracle device to, responsive to determining that the confidence score exceeds a threshold value, send a positive binary value to the blockchain node.

Clause 13: The oracle device of clause 11, wherein the instructions, when executed by the processor, are further configured to cause the oracle device to train the machine learning model based on transaction pattern data for a plurality of blockchain payment transactions associated with a plurality of entities.

Clause 14: The oracle device of clause 11, wherein the generated confidence score comprises a binary value and the smart contract is configured to allow the automated transfer of the asset to the destination address via the blockchain network, when the binary value is a positive value, and disallow the automated transfer of the asset, when the binary value is a negative value.

Clause 15: The oracle device of clause 11, wherein the transaction context data comprises one or more of an identity of a recipient of the asset, a purpose of the automated transfer, an amount of the automated transfer, or a category of goods or services associated with the automated transfer.

Clause 16: The oracle device of clause 11, wherein the transaction context data comprises an identity of a recipient of the asset and the confidence score reflects a likelihood that the destination address belongs to the identity.

Clause 17: An oracle device, comprising: a processor; and memory in communication with the processor and storing instructions that, when executed by the processor, are configured to cause the oracle device to: receive transaction context data from a source device, wherein the transaction context data comprises a destination address and is associated with a transfer of an asset via a blockchain network; apply a machine learning model to the transaction context data to generate a confidence score; send the generated confidence score to the source device in response to the transaction context data; and update the machine learning model based on the transaction context data and a completion indication received from the source device and indicative of whether the asset was transferred via the destination address.

Clause 18: The oracle device of clause 17, wherein the instructions, when executed by the processor, are further configured to cause the oracle device to train the machine learning model based on transaction pattern data for a plurality of blockchain payment transactions associated with a plurality of entities.

Clause 19: The oracle device of clause 17, wherein the source device comprises a client device, transaction context data is received from a wallet application executed by the client device, and the generated confidence score is sent to the wallet application.

Clause 20: The oracle device of clause 17, wherein the source device comprises a blockchain node of a blockchain network and the transaction context data is received following execution of a smart contract on the blockchain node.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An oracle device for verifying destination address validity on a blockchain network deployed for recording digital asset transactions, the oracle device comprising:
a processor in electronic communication with the blockchain network and a client computing device hosting a wallet application associated with a digital wallet of a user of the client computing device and for generating an interface for entry of a proposed transfer of a digital asset maintained in the digital wallet, wherein the proposed transfer comprises one of a plurality of destination blockchain addresses on the blockchain network selected by the user for the proposed transfer and an amount of the digital asset for transfer to the selected one of the destination blockchain addresses; and
memory in communication with the processor and storing a database accessible by the processor for storing blockchain address identity verification data relating to a plurality of third parties, associated with historical transactions stored on the blockchain network, and obtained by the oracle device via one or more smart contracts coupled to one or more nodes on the blockchain network, wherein the oracle device is further configured to access and store in the database public blockchain data and external source data pertaining to address identity verification of each of the third parties, and instructions that, when executed by the processor, are configured to cause the oracle device to:
monitor blockchain payment transactions executed on the blockchain network to generate transaction pattern data comprising one or more distributions for the destination blockchain addresses, wherein each of the distributions comprises a value range for a subset of the blockchain payment transactions pertaining to respective ones of the destination blockchain addresses and for at least one characteristic comprising payment type, payment amount, payment purpose, or a category of goods or services;
train a machine learning model based on the transaction pattern data by analyzing trends or patterns among the characteristics for entities associated with the monitored blockchain payment transactions represented in transaction pattern data;
receive transaction context data from the wallet application executed by the client computing device, wherein the transaction context data comprises the one of the destination blockchain addresses and contextual information associated with the proposed transfer;
apply the trained machine learning model to the contextual information;
determine whether the machine learning model is capable of generating a confidence score associated with the proposed transfer, wherein the confidence score is indicative of whether the one of the destination blockchain addressees can be verified and is generated at least in part on a comparison of one or more portions of the contextual information to one or more of the distributions for the one of the destination blockchain addresses, wherein the determination is based on whether there is a sufficiency of data stored in the database associated with the one of the destination blockchain addresses;

record the one of the destination blockchain addresses in the database for subsequent forensic analysis, when the determination indicates the machine learning model is incapable of generating the confidence score;

send the confidence score to the wallet application in response to the transaction context data and for display by the client computing device, when the determination indicates the machine learning model is capable of generating the confidence score; and update the machine learning model based on the transaction context data and a completion indication received from the wallet application and indicative of whether the digital asset was transferred to a recipient via the one of the destination blockchain addresses.

2. The oracle device of claim 1, wherein the sufficiency is based on an accuracy metric relating to a threshold number of historical transactions associated with the one of the destination blockchain addresses.

3. The oracle device of claim 1, wherein the instructions, when executed by the processor, are further configured to cause the oracle device to asynchronously retrieve the one of the destination blockchain addresses from the database and perform the forensic analysis of the one of the destination blockchain addresses.

4. The oracle device of claim 3, wherein the instructions, when executed by the processor, are further configured to cause the oracle device to one or more of determine whether fraud has been reported as associated with the one of the destination blockchain addresses, query one or more blockchain exchange service databases to obtain address identity verification data, or perform web scraping of one or more websites based on the one of the destination blockchain addresses, in order to perform the forensic analysis.

5. The oracle device of claim 1, wherein the instructions, when executed by the processor, are further configured to cause the oracle device to:

receive from the wallet application an indication of fraudulent activity associated with the proposed transfer subsequent to completion of the proposed transfer; and update the machine learning model based on the indication of fraudulent activity.

6. The oracle device of claim 1, wherein the transaction context data comprises an identity of the recipient and the confidence score reflects a likelihood that the recipient identity corresponds with the one of the destination blockchain addresses.

7. The oracle device of claim 1, wherein the distributions comprise a payment type distribution, an amount distribution, a purpose distribution, or a category of associated goods or services distribution.

8. The oracle device of claim 1, wherein the transaction context data comprises an identity of the recipient and the instructions, when executed by the processor, are further configured to cause the oracle device to, responsive to determining that the confidence score exceeds a threshold value, record a non-fungible token (NFT) in the blockchain network, wherein the NFT comprises an association of the one of the destination blockchain addresses and the recipient identity.

9. An oracle device for verifying destination address validity on a blockchain network deployed for recording digital asset transactions, the oracle device comprising:

a processor in electronic communication with a blockchain node of the blockchain network; and memory in communication with the processor and storing a database accessible by the processor for storing blockchain address identity verification data relating to a plurality of third parties, associated with historical transactions stored on the blockchain network, wherein the oracle device is further configured to access and store in the database public blockchain data and external source data pertaining to address identity verification of each of the third parties, and instructions that, when executed by the processor, are configured to cause the oracle device to:

train a machine learning model based on transaction pattern data comprising one or more distributions for a plurality of destination addresses associated with historical payment transactions executed on the blockchain network, wherein each of the distributions comprises a value range for a subset of the blockchain payment transactions pertaining to respective ones of the destination addresses and for at least one characteristic comprising payment type, payment amount, payment purpose, or a category of goods or services;

receive transaction context data from the blockchain node following execution of a smart contract on the blockchain node, wherein the transaction context data comprises one of the destination addresses and contextual information associated with an automated transfer of digital asset to the one of the destination addresses via the blockchain network;

apply the machine learning model to the contextual information;

determine whether the machine learning model is capable of generating a confidence score associated with the automated transfer, wherein the confidence score is indicative of whether the one of the destination addresses can be verified and is generated at least in part on a comparison of one or more portions of the contextual information to one or more of the distributions for the one of the destination addresses, wherein the determination is based on whether there is a sufficiency of data stored in the database associated with the one of the destination blockchain addresses;

record the one of the destination addresses in the database for subsequent forensic analysis, when the determination indicates the machine learning model is incapable of generating the confidence score;

send the confidence score to the blockchain node in response to the transaction context data, when the determination indicates the machine learning model is capable of generating the confidence score; and update the machine learning model based on the transaction context data and a completion indication received from the blockchain node and indicative of whether the digital asset was transferred via the one of the destination addresses and the blockchain network.

10. The oracle device of claim 9, wherein the instructions, when executed by the processor, are further configured to cause the oracle device to, responsive to determining that the confidence score exceeds a threshold value, send a positive binary value to the blockchain node.

11. The oracle device of claim 9, wherein the confidence score comprises a binary value and the smart contract is configured to allow the automated transfer of the digital asset to the one of the destination addresses via the blockchain network, when the binary value is a positive value, and disallow the automated transfer of the digital asset, when the binary value is a negative value.

12. The oracle device of claim 9, wherein the instructions, when executed by the processor, are further configured to cause the oracle device to record the one of the destination addresses in the database for subsequent forensic analysis, when the determination indicates the machine learning model is incapable of generating the confidence score.

13. The oracle device of claim 9, wherein the transaction context data comprises an identity of a recipient of the digital asset and the confidence score reflects a likelihood that the one of the destination addresses belongs to the identity.

14. An oracle device for verifying destination address validity on a blockchain network deployed for recording digital asset transactions, the oracle device comprising:
 a processor in electronic communication with a source device; and
 memory in communication with the processor and storing a database accessible by the processor for storing blockchain address identity verification data relating to a plurality of third parties, associated with historical transactions stored on the blockchain network, and obtained by the oracle device via one or more smart contracts coupled to one or more nodes on the blockchain network, wherein the oracle device is further configured to access and store in the database public blockchain data and external source data pertaining to address identity verification of each of the third parties, and instructions that, when executed by the processor, are configured to cause the oracle device to:
  train a machine learning model based on transaction pattern data comprising one or more distributions for a plurality of destination addresses associated with historical payment transactions executed on the blockchain network, wherein each of the distributions comprises a value range for a subset of the blockchain payment transactions pertaining to respective ones of the destination addresses and for at least one characteristic comprising payment type, payment amount, payment purpose, or a category of goods or services;
  receive transaction context data from the source device, wherein the transaction context data comprises one of the destination addresses and contextual information associated with a transfer of a digital asset to the one of the destination addresses via the blockchain network;
  apply the machine learning model to the contextual information;
  determine whether the machine learning model is capable of generating a confidence score associated with the transfer, wherein the confidence score is indicative of whether the one of the destination addresses can be verified and is generated based on a comparison of one or more portions of the contextual information to one or more of the distributions for the one of the destination addresses, wherein the determination is based on whether there is a sufficiency of data stored in the database associated with the one of the destination blockchain addresses;
  record the one of the destination blockchain addresses in the database for subsequent forensic analysis, when the determination indicates the machine learning model is incapable of generating the confidence score;
  send the confidence score to the source device in response to the transaction context data, when the determination indicates the machine learning model is capable of generating the confidence score; and
  update the machine learning model based on the transaction context data and a completion indication received from the source device and indicative of whether the digital asset was transferred via the one of the destination addresses.

15. The oracle device of claim 14, wherein the source device comprises a client computing device hosting a wallet application associated with a digital wallet of a user of the client computing device and for generating an interface for entry of the transfer of the digital asset maintained in the digital wallet, the transaction context data is received from the wallet application executed by the client computing device, the confidence score is sent to the wallet application, the one of the destination addresses is selected by a user of the client computing device, and the processor is in electronic communication with the blockchain network and the client computing device.

16. The oracle device of claim 14, wherein the source device comprises a blockchain node of the blockchain network and the transaction context data is received following execution of a smart contract on the blockchain node.

17. The oracle device of claim 14, wherein the instructions, when executed by the processor, are further configured to cause the oracle device to record the one of the destination addresses in the database for subsequent forensic analysis, when the determination indicates the machine learning model is incapable of generating the confidence score.

\* \* \* \* \*